United States Patent Office.

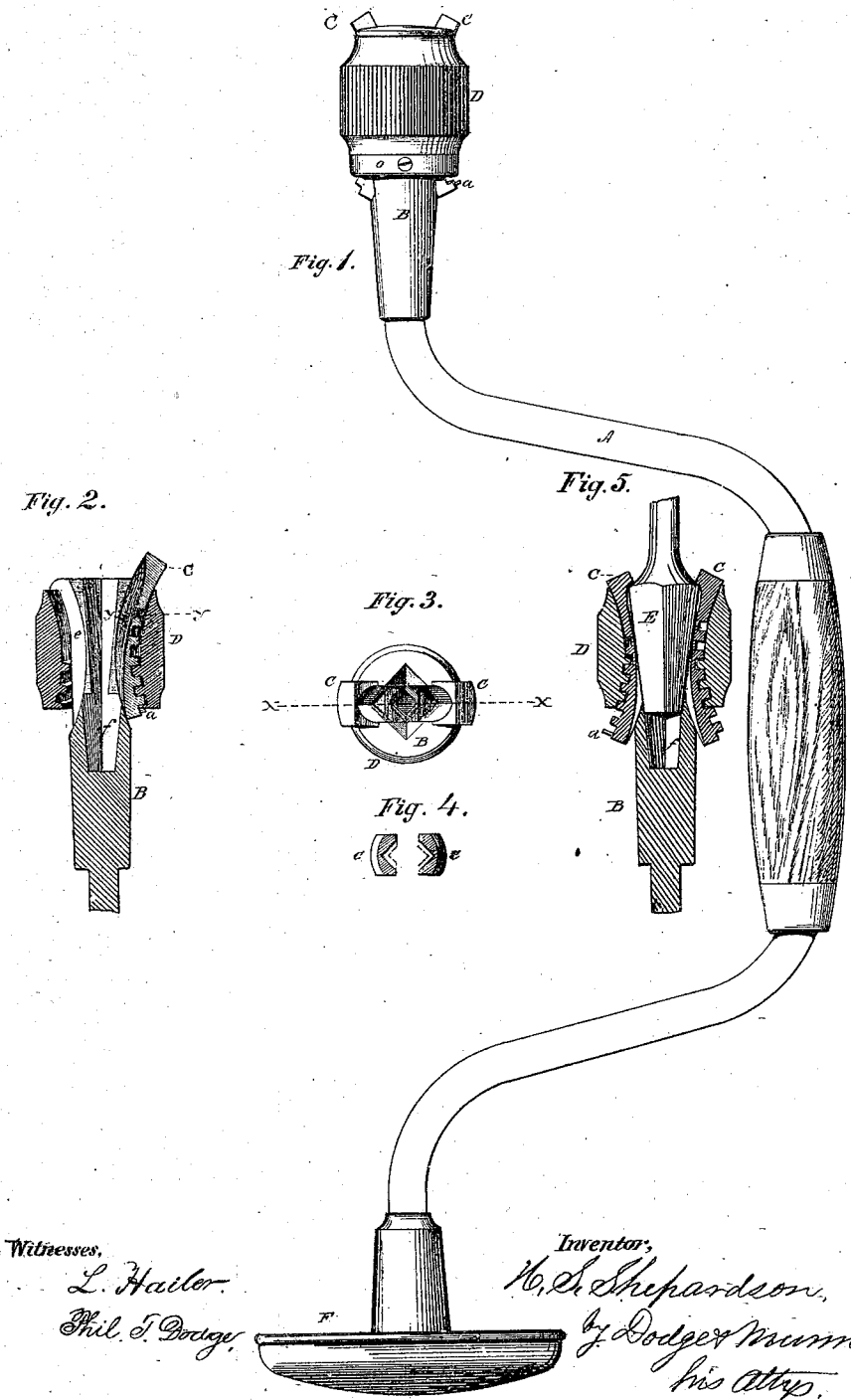

H. S. SHEPARDSON, OF SHELBURNE FALLS, MASSACHUSETTS.

Letters Patent No. 100,458, dated March 1, 1870.

IMPROVEMENT IN BIT-BRACE.

The Schedule referred to in these Letters Patent and making part of the same.

To all whom it may concern:

Be it known that I, H. S. SHEPARDSON, of Shelburne Falls, in the county of Franklin, and State of Massachusetts, have invented certain Improvements in Bit-Stocks, of which the following is a specification, reference being had to the accompanying drawings.

My invention relates to bit-stocks; and

The invention consists in a novel construction of the parts which secure the bit in the stock, as hereinafter more fully explained.

Figure 1 is a side elevation of my improved bit-stock complete;

Figure 2 is a section on the line $x$ $x$ of fig. 3, with one jaw removed;

Figure 3 is an end view;

Figure 4, a cross-section of the jaws on the line $y$ of fig. 2; and

Figure 5 is a sectional view on the line $x$ $x$ of fig. 3 with a bit inserted.

In constructing my improved stock, I make the body A, and rose, F, in the usual manner.

Upon the opposite or lower end I secure a head, B, somewhat larger in diameter than the body, and in this head form longitudinally a conical socket, $f$, as shown in figs. 2 and 5.

The exterior of this head B, at its end, is also made conical, with a flange or collar at its extreme end, and has fitted upon it a ring or loose collar, D, which has a screw-thread cut on its interior, as shown in figs. 2 and 5.

In opposite sides of the head B, I cut grooves $e$, as seats for the sliding jaws C. These grooves are formed in the arc of a circle longitudinally, and are rectangular transversely, the jaws being made of a corresponding form, as shown in figs. 2 and 5, and having teeth or sectional screw-threads on their exterior face, to engage with the screw-thread on the interior of the ring D. These jaws also have a V-shaped recess or cavity, made longitudinally in their inner faces, as represented in figs. 2, 3, and 4. This cavity does not extend the entire length of the jaws C, but commences gradually near one end, and increases in depth until near the opposite end, where they cease entirely, as shown clearly in fig. 2.

The parts being thus constructed, the ring D is slipped down to its position against the flange on the end of the head B, where it is secured by a small collar, $o$, screwed on above it, as shown in fig. 1, or by a pin, as may be preferred. The jaws C being then inserted from the outer end into the grooves $e$, the ring D is turned, which draws the jaws inward, as shown in fig. 5. A small pin, $a$, is then inserted in a hole near the inner end of one of the jaws, as shown in fig. 5, which pin serves as a stop when it strikes against the edge of the ring D, as represented in fig. 2, thereby preventing the jaws from being screwed out beyond a certain point.

In operation, a bit, E, is inserted into the conical cavity in the end of the head B, and the ring D is then turned in the proper direction to draw the jaws C inward from the end.

In consequence of the segmental or curved form of the jaws, and of the grooves in which they slide, their outer ends are drawn towards each other as they recede, thus clasping the shank of the bit E between them, the outer ends of the jaws grasping over the shoulders of the bit-shank, thereby forcing the bit firmly down into the socket of the head B, and holding it tightly in position. To release the bit, it is only necessary to reverse the movement of the ring D, and force the jaws C outward.

This particular form and movement of the jaws furnishes a very secure fastening, and the parts being well adapted to being made by machinery, enables me to produce a very complete article at a comparatively low price.

Having thus described my invention,

What I claim, is—

1. The curved or segmental sliding jaws C, constructed and arranged to operate in a bit-stock, or similar tool-holding device, substantially as described.

2. A bit-stock having the curved jaws C, ring D, and head B, constructed and arranged to operate substantially as set forth.

H. S. SHEPARDSON.

Witnesses:
H. B. MUNN,
PHIL. T. DODGE.